3,185,731
CRYSTALLIZATION OF UREA
Petrus J. C. Kaasenbrood, Sittard, Netherlands, assignor to Stamicarbon N.V., Heerlen, Netherlands
No Drawing. Filed Oct. 18, 1962, Ser. No. 231,593
Claims priority, application Netherlands, Oct. 26, 1961, 270,676
1 Claim. (Cl. 260—555)

The present invention relates to the separation of pure urea from aqueous solutions of urea contaminated with biuret.

In French Patent No. 1,127,788 a method is described for the crystallization of urea from biuret-containing urea solutions, according to which method either an amount of water vapour equal to the amount of water introduced by freshly supplied solution is continuously removed from an evaporating urea solution with simultaneous removal of the urea crystals, or an unsaturated urea solution is cooled to below the saturation point, seeing to it in both cases that the biuret content in the evaporating or cooled solution does not exceed—

| Percent by weight biuret | When the temperature (° C.) of the solution is— |
|---|---|
| 32 | 90 |
| 29 | 80 |
| 25 | 70 |
| 20 | 60 |
| 14 | 50 |
| 10 | 40 |
| 7 | 30 |
| 5 | 20 | and that at intermediate temperatures the biuret content does not exceed the biuret concentrations proportional thereto.

It has now been found that these values for the biuret content are too high. It is not possible to isolate pure urea crystals at the biuret contents referred to in the above table because a small amount of a double salt [2 urea. 1 biuret] invariably proves to crystallize out along with urea.

However, it was found that virtually pure urea crystals can be obtained if the biuret content does not rise above:

| Percent by weight biuret | When the temperature (° C.) of the solution is— |
|---|---|
| 21 | 90 |
| 17 | 80 |
| 14 | 70 |
| 12 | 60 |
| 9 | 50 |
| 8 | 40 |
| 6 | 30 |
| 4 | 20 |

To keep the biuret content in the solution below this limit, the suspension of urea crystals in mother liquor is circulated externally of the crystallizer and the crystals are separated, e.g., by filtration. Then, before the solution freed of urea crystals (the mother liquor) is returned to the crystallizer to mingle with the main body of crystallizing liquid, it must be periodically or continuously purged of part of the dissolved biuret, to make room for new biuret which is constantly being introduced in the freshly supplied crude biuret-containing urea solution.

As already known, this can be effected, for instance, by crystallizing biuret in a second crystallizer by first diluting the mother liquor and subsequently cooling it. In this way, part of the dissolved biuret is enabled to crystallize to form a suspension from which the crystals formed may easily be separated. To crystallize the biuret under the most favorable conditions, it is best to try to raise the biuret concentration in the mother liquid as high as possible before diluting and cooling this solution.

According to the invention, the crystallization of urea from the biuret-containing urea solution is effected in a continuous cyclic process at a temperature of 90° C. or more and a pressure below 160 mm. Hg with continuous introduction of a biuret-containing urea solution, separation of the urea crystals from a mother liquor with recovery of a mother liquor with a biuret content of at least 15 but at most 25% by weight, and recirculation of the mother liquor to the crystallizer after an amount of biuret substantially equal to the amount introduced by the fresh urea solution to be crystallized has been removed from part of this mother liquor by diluting and cooling.

*Example*

From a urea crystallizer, working in vacuo, in which the temperature of the crystallizing solution is kept at 110° C. and a pressure of 80 mm. Hg is maintained, an approximately 25% by weight suspension of urea crystals in mother liquor consisting of 100 kg. of urea crystals and 313.5 kg. of solution containing 243 kg. of urea
59.5 kg. of biuret
11 kg. of water is discharged per cycle.

The solution is centrifuged; 8.8 kg. of the mother liquor obtained were separated off. The remaining 304.7 kg., together with the fresh supply of urea solution to be crystallized, which weighs 110 kg. (100 kg. of urea, 0.9 kg. of biuret, 8.8 kg. of water) and is used as washing liquid, were fed back to the urea crystallizer.

The 100 kg. of centrifuged crystals together with 6.7 kg. of adhering, very concentrated urea solution were cooled yielding 106 kg. of urea with a biuret content of 0.05%.

The 8.8 kg. of mother liquor separated off were diluted with 5.8 kg. of water and cooled to 25° C.; from this mother liquor 0.9 kg. of biuret with 0.13 kg. of water (5 biuret·4H$_2$O) crystallized out.

An additional amount of 3.2 kg. of water was evaporated from the remaining solution in a separate evaporator at 120° C. and atmospheric pressure, and the solution concentrated in this way consisting of 6.8 kg. of urea, 0.8 kg. of biuret, and 2.8 kg. of water, was also returned to the urea crystallizer. 11.4 kg. of water were removed from the urea crystallizer per cycle.

In this way therefore, 0.9 kg. of biuret are removed from a biuret-containing mother liquor with a biuret content of 19 percent by weight after previously diluting the solution with 5.8 kg. of water, i.e., with 6.4 kg. of water per kg. of biuret.

If the urea crystallization should be effected at much lower temperatures, for instance at 60° C. and at a pressure of 70 mm. Hg, it would also be possible to discharge an approximately 25% by weight crystal suspension, which, after separation, would yield a mother liquor containing 10% by weight of biuret.

To remove 0.9 kg. of biuret from this mother liquor, the latter would have to be diluted with 11.9 kg. of water, i.e., with 13 kg. of water per kg. of biuret, i.e., with twice the amount needed in the process according to the invention.

As this diluting water has to be evaporated eventually, a decrease of the amount of diluting water to be added considerably lowers the process costs.

What is claimed is:

A cyclic process for the crystallization in vacuo of urea from a biuret-containing urea solution comprising continuously introducing the biuret-containing urea solution into a crystallizer, crystallizing urea from said solution in said crystallizer at a temperature of at least 90° C. and a pressure below 160 mm., continuously withdrawing from the crystallizer a suspension of urea crystals in a mother liquor containing at least 15 and at most 25 percent by weight of biuret, separating and removing from the withdrawn liquid an amount of biuret substantially equal to the amount introduced by the fresh biuret-containing urea solution to be crystallized and recirculating the mother liquor to the urea crystallizer.

References Cited by the Examiner
FOREIGN PATENTS
1,127,788  12/56  France.

NICHOLAS S. RIZZO, *Primary Examiner.*
D. T. McCUTCHEN, *Examiner.*